US007775696B2

(12) United States Patent
Suzuki

(10) Patent No.: US 7,775,696 B2
(45) Date of Patent: Aug. 17, 2010

(54) VEHICLE HEADLAMP

(75) Inventor: Eiji Suzuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 237 days.

(21) Appl. No.: 11/890,512

(22) Filed: Aug. 7, 2007

(65) Prior Publication Data

US 2008/0055921 A1 Mar. 6, 2008

(30) Foreign Application Priority Data

Aug. 31, 2006 (JP) ............................ 2006-235542

(51) Int. Cl.
*B60Q 1/321* (2006.01)

(52) U.S. Cl. ....................... 362/507; 362/523; 362/529; 362/532; 362/539; 362/280

(58) Field of Classification Search ................. 362/507, 362/539, 512, 523, 526, 529, 532, 282, 270–274, 362/280, 284
See application file for complete search history.

(56) References Cited

U.S. PATENT DOCUMENTS 7,140,759 B1 * 11/2006 Tsai et al. ................... 362/539

FOREIGN PATENT DOCUMENTS

| | | | |
|---|---|---|---|
| EP | 1 286 106 | A1 | 2/2003 |
| EP | 1 559 952 | A2 | 8/2005 |
| JP | 2000-021226 | A | 1/2000 |
| JP | 2001-291411 | A | 10/2001 |
| JP | 2003-59311 | A | 2/2003 |
| JP | 2003-151319 | A | 5/2003 |
| JP | 2005-011711 | A | 1/2005 |

* cited by examiner

*Primary Examiner*—Jong-Suk (James) Lee
*Assistant Examiner*—Mark Tsidulko
(74) *Attorney, Agent, or Firm*—Foley & Lardner LLP

(57) ABSTRACT

A reflector reflects a light from a light source. A projector lens projects a reflected light from the reflector ahead of a vehicle. A shade is used to switch the reflected light into a plurality of beams in a plurality of light distribution patterns. A spring member and a drive unit switch a position of the shade between an obliquely upward and backward position and an obliquely downward and forward position to obtain the light distribution patterns.

8 Claims, 6 Drawing Sheets

VEHICLE HEADLAMP

CROSS-REFERENCE TO RELATED APPLICATIONS

The present application claims priority to and incorporates by reference the entire contents of Japanese priority document, 2006-235542 filed in Japan on Aug. 31, 2006.

BACKGROUND OF THE INVENTION

1. Field of the Invention

The present invention relates to a bifunctional-type vehicle headlamp, such as a projector-type vehicle headlamp, capable of obtaining a plurality of light distribution patterns including a low-beam light distribution pattern and a high-beam light distribution pattern.

2. Description of the Related Art

A conventional projector-type vehicle headlamp as disclosed in Japanese Patent Application Laid-open No. 2003-59311 includes a light source, a reflector, a projector lens, a shade, a spring member, and a solenoid.

When the light source lights up, a light emitted from the light source is reflected to the sides of the shade and the projector lens by a reflecting surface of the reflector. Then, the reflected light is projected ahead of a vehicle by the projector lens. At this time, a position of the shade is switched among a plurality of positions by the actions of the spring member and a retractable rod of the solenoid. As a result, the reflected light towards the projector lens is also switched among a plurality of beams in a plurality of light distribution patterns.

However, in the conventional vehicle headlamp, a position of the shade is switched in an upward direction or a downward direction (in a vertical direction), so that a direction in which a spring force of the spring member acts is also the vertical direction. Therefore, in a case in which a dome-shaped spring, for example, a spring member 60 shown in FIG. 4, is used as the spring member, a height of the spring member 60 viewed from the front and lateral sides disadvantageously increases, and thus a height of the entire vehicle headlamp also increases.

SUMMARY OF THE INVENTION

It is an object of the present invention to at least partially solve the problems in the conventional technology.

A projector-type vehicle headlamp according to one aspect of the present invention is capable of obtaining a plurality of light distribution patterns. The projector-type vehicle headlamp includes a light source that emits a light; a reflector that reflects the light from the light source; a projector lens that projects a reflected light from the reflector ahead of a vehicle; a shade that is used to switch the reflected light into a plurality of beams in a plurality of light distribution patterns; and a spring member and a drive unit that switch a position of the shade between an obliquely upward and backward position and an obliquely downward and forward position to obtain the light distribution patterns.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
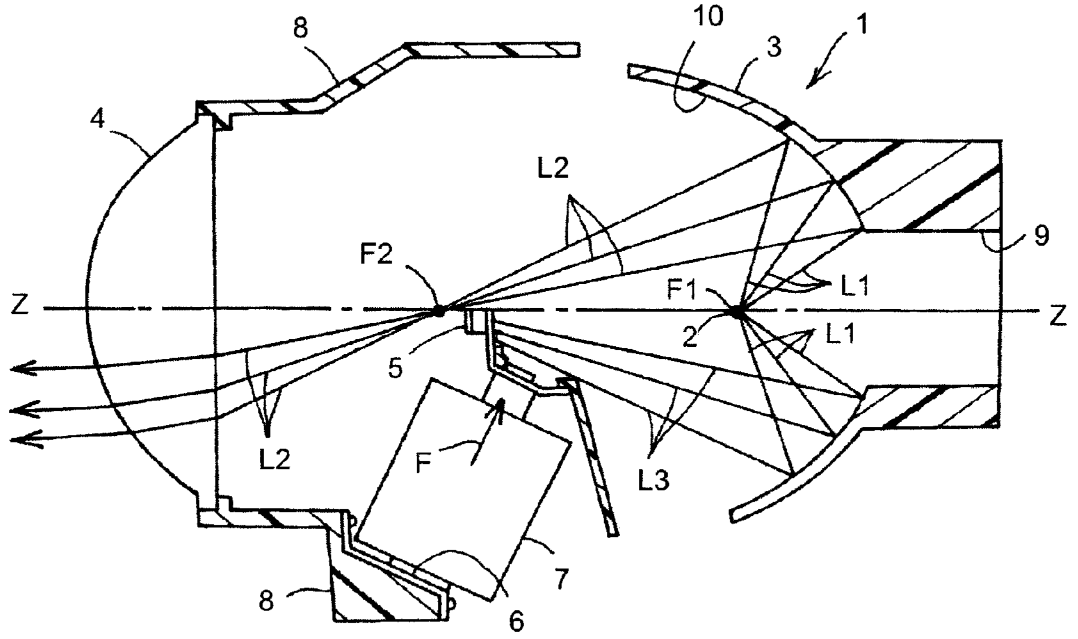
FIG. 1 is a longitudinal cross-sectional view (a vertical cross-sectional view) of a lamp unit of a vehicle headlamp according to an embodiment of the present invention when a shade of the vehicle headlamp is in a low-beam position.

Exemplary embodiments of a vehicle headlamp according to the present invention are explained in detail below with reference to the accompanying drawings. The present invention is not limited to the embodiments. In the drawings, "VU-VD" denotes a vertical line running up and down a screen where a light in a predetermined light distribution pattern is projected, and "HL-HR" denotes a horizontal line running right and left the screen. In the embodiments, "up", "down", "front", "back", "left", and "right" sides respectively denote the up, down, front, back, left, and right sides of a vehicle on which the vehicle headlamp according to the embodiments is mounted.

A configuration of a vehicle headlamp 1, such as a projector-type vehicle headlamp, is explained in detail below with reference to FIGS. 1 and 2. The vehicle headlamp 1 is mounted on the right and left sides of a front face of the vehicle. The vehicle headlamp 1 includes a light source 2, a reflector 3, a projector lens (a convex condenser lens) 4, a shade 5, a spring member 6, a solenoid 7 as a drive unit, a frame member 8, a lamp housing (not shown), and a lamp lens such as a plain outer lens (not shown).

A lamp unit is formed by the light source 2, the reflector 3, the projector lens 4, and the shade 5, the spring member 6, the solenoid 7, and the frame member 8. The lamp unit is arranged inside a lamp room (not shown) that is partitioned by the lamp housing and the lamp lens via an optical-axis adjusting mechanism (not shown) or the like.

A discharge lamp (not shown) is used as the light source 2 in the embodiment. The discharge lamp is, for example, a high-pressure metal-vapor discharge lamp such as a metal halide lamp, or a high-intensity discharge (HID) lamp. The light source 2 is removably attached to the reflector 3 via a socket mechanism (not shown). Instead of the discharge lamp, a halogen bulb or an incandescent bulb can be used as the light source 2.

The reflector 3 reflects a light L1 emitted from the light source 2 to a side of the projector lens 4. The reflector 3 is fixedly held by the frame member 8. The reflector 3 has an opening to the front side (a side of a direction in which the vehicle headlamp 1 lights), i.e., the back side of the reflector 3 is closed. In other words, the reflector 3 has a hollow concave shape with the opening to the front side. A circular through-hole 9 is provided in the center of the closed portion of the reflector 3 in the back side, and the light L1 emitted from the light source 2 enters through the through-hole 9.

A concave inner surface of the reflector 3 is finished with aluminum coating by the aluminum evaporation or with silver coating, and thereby forming a reflecting surface 10 thereon. The reflecting surface 10 is formed of an ellipsoid or ellipsoid basis reflecting surface such as an ellipsoid of revolution or ellipsoid basis free-form surface (a non-uniform rational B-spline (NURBS) surface) (see, for example, "Mathematical Elements for Computer Graphics" written by David F. Rogers and J. Alan Adams). Namely, a vertical cross-sectional surface of the reflector 3 shown in FIGS. 1 and 2 is formed of an ellipsoid surface, and a horizontal cross-sectional surface (not shown) of the reflector 3 is formed of a paraboloidal surface or a distorted paraboloidal surface. Therefore, the reflecting surface 10 includes a first focal point F1, a second focal point F2 (on a focal line on the horizontal cross-sectional surface), and an optical axis Z-Z. The first focal point F1 is located on or adjacent to a light-emitting portion (not shown) of the light source 2. The second focal point F2 is located in the front side of the shade 5 (in a side of the projector lens 4).

The projector lens 4 projects reflected lights L2 and L3, which are reflected by the reflecting surface 10 of the reflector 3, ahead of the vehicle. The projector lens 4 is formed by a convex aspheric lens that includes a convex aspheric surface in the front side and a flat aspheric surface (a flat surface) in the back side. The projector lens 4 is fixedly held by the frame member 8. The projector lens 4 includes a lens focal point (a meridional image surface that is a focal plane in a side of an object space) (not shown) and an optical axis (not shown). The lens focal point of the projector lens 4 is identical (or substantially identical) to the second focal point F2 of the reflecting surface 10. The optical axis of the projector lens 4 is identical (or substantially identical) to the optical axis Z-Z of the reflecting surface 10. Incidentally, the optical axis of the projector lens 4 and the optical axis Z-Z of the reflecting surface 10 can be shifted to the right or left side.

Figure 11:
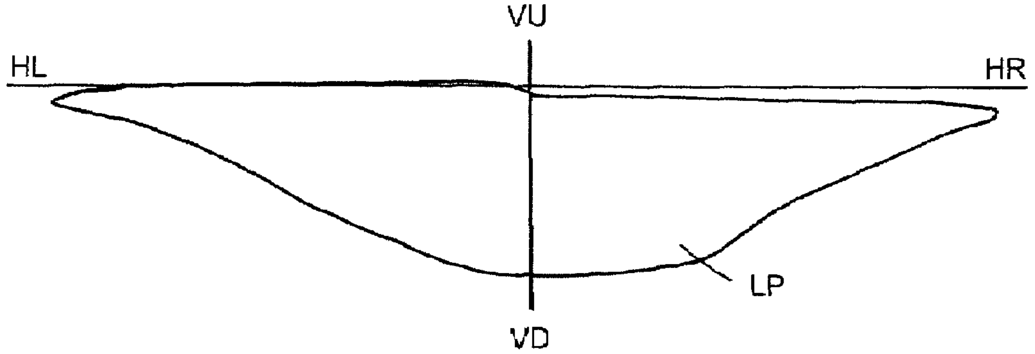
FIG. 11 is a schematic diagram for explaining a low-beam light distribution pattern.
Figure 12:
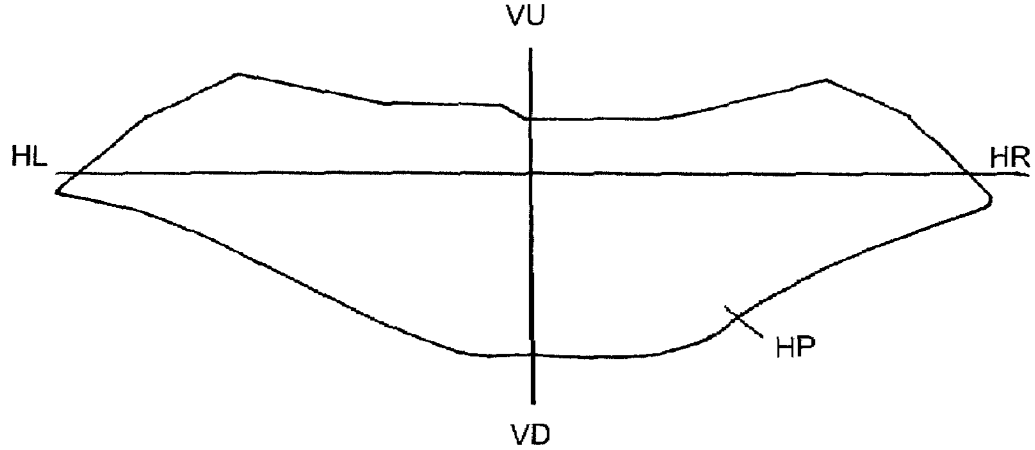
FIG. 12 is a schematic diagram for explaining a high-beam light distribution pattern.

The reflected lights L2 and L3 are switched to a plurality of beams, i.e., a low beam LB2 and high beams HB2 and HB3 by the shade 5. The low beam LB2 and high beams HB2 and HB3 respectively have a plurality of light distribution patterns, for example, a low-beam light distribution pattern LP as shown in FIG. 11, which is used in such a case that there is an oncoming vehicle, and a high-beam light distribution pattern HP as shown in FIG. 12, which is used in such a case that there is no oncoming vehicle. The shade 5 is made of a plate-like member such as a flat thin steel sheet to reduce a production cost.

Figure 3:
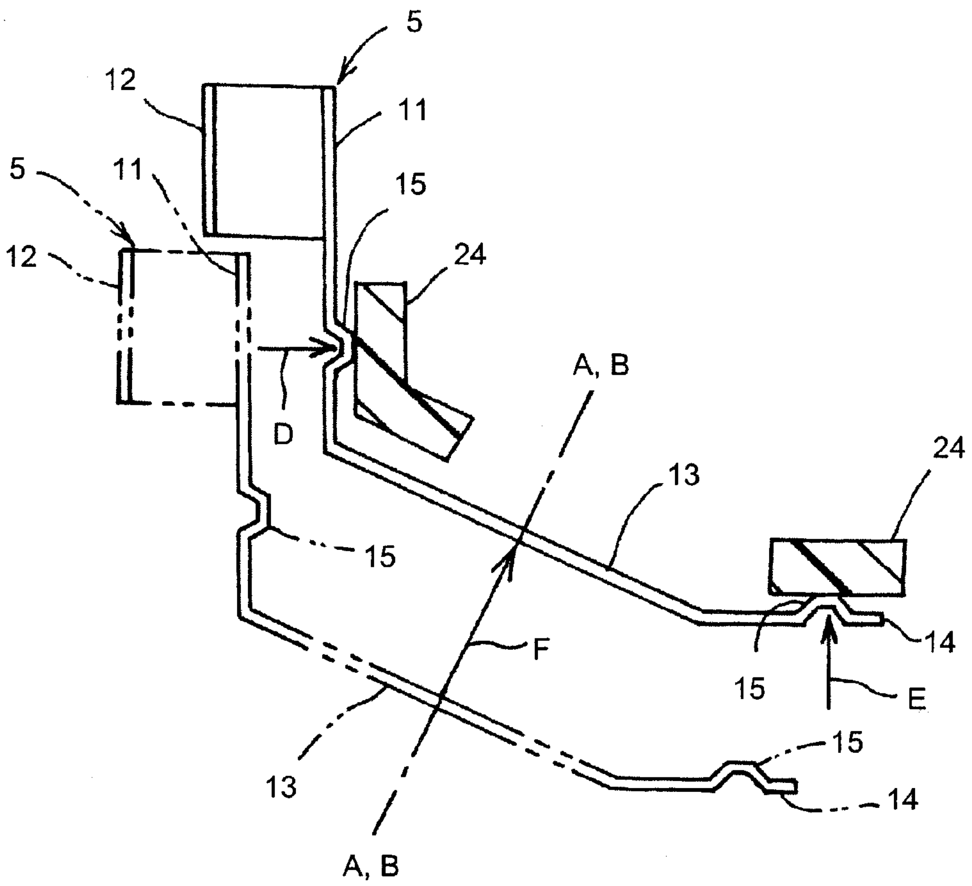
FIG. 3 is a schematic diagram for explaining the low-beam position and the high-beam position of the shade.
Figure 6:
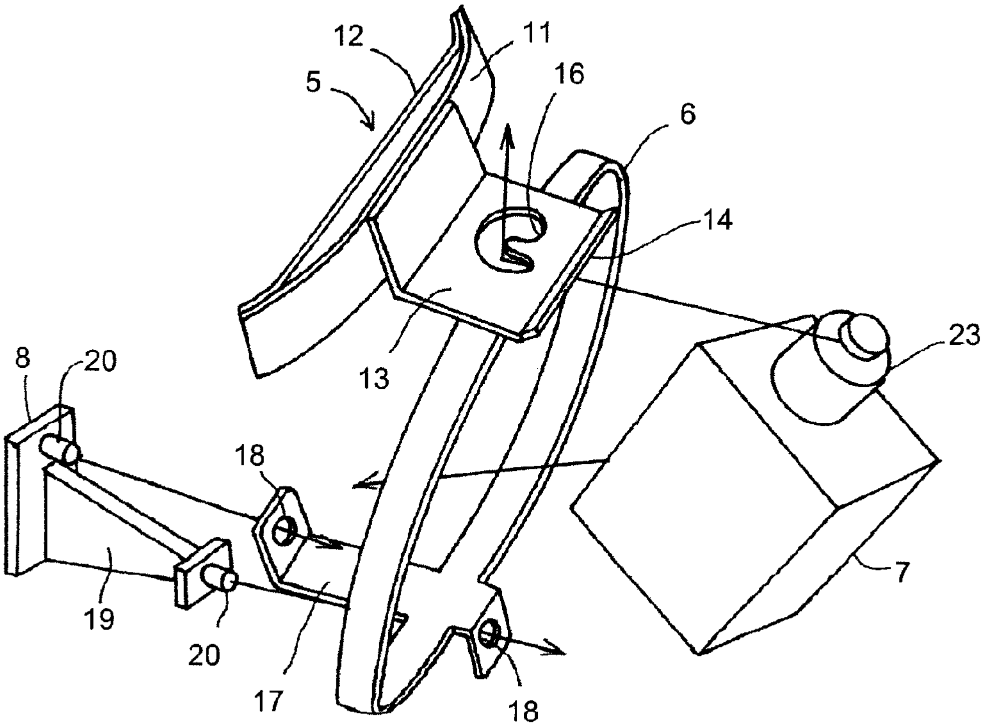
FIG. 6 is a schematic diagram for explaining how a spring member is fixed on the frame member and how the solenoid is attached to the spring member.

As shown in FIG. 3, the shade 5 includes a vertically-extending first shade portion 11 (in a side of the light source 2), a vertically-extending second shade portion 12 (in a side of the projector lens 4) that is shorter than the first shade portion 11, an obliquely-extending fixing portion 13, and a horizontally-extending stopper portion 14. The first and the second shade portions 11 and 12 switch the reflected lights L2 and L3 to the low beam LB2 and the high beams HB2 and HB3. A convex stopper portion 15 is provided on each of the first shade portion 11 and the stopper portion 14. As shown in FIG. 6, a fixing hole 16 is provided on the fixing portion 13.

The spring member 6 and the solenoid 7 switch a position of the shade 5 between an obliquely upward and backward position and an obliquely downward and forward position, i.e., a low-beam position and a high-beam position where the low beam LB2 and the high beams HB2 and HB3 can be obtained. The low-beam position of the shade 5 is the obliquely upward and backward position as indicated by a solid line in FIGS. 1 and 3, and the high-beam position of the shade 5 is the obliquely downward and forward position as indicated by a solid line in FIG. 2 and a dashed-two dotted line in FIG. 3.

The spring member 6 is made of an elastic thin plate-like member, such as a spring steel made of a stainless used steel (SUS). As shown in FIG. 6, the spring member 6 has a dome shape. The spring member 6 is integrated with the shade 5. Specifically, the fixing portion 13 of the shade 5 is integrally-fixed in the almost center of an upper horizontal portion of the spring member 6. Incidentally, the shade 5 and the spring member 6 can be separately manufactured, and then integrally-fixed to each other. Alternatively, the shade 5 and the spring member 6 can be simultaneously manufactured from one thin steel sheet by press working.

The spring member 6 is fixed to the frame member 8. Specifically, a rectangular-shaped fixed portion 17 is integrally provided in the almost center of a lower horizontal portion of the spring member 6. A front end of the fixed portion 17 is folded upwards, and a back end of the fixed portion 17 is folded downwards. A fixing hole 18 is provided on each of the folded ends. A tilted locking rib 19 is provided on a lower portion of the frame member 8. A fixing pin 20 is provided on top of a front end portion of the tilted locking rib 19 and beside a back end portion of the tilted locking rib 19. The fixing pin 20 provided on top of the front end portion of the tilted locking rib 19 is inserted into the fixing hole 18 provided on the back end of the fixed portion 17, which is folded downwards, and the fixing pin 20 provided beside the back end portion of the tilted locking rib 19 is inserted into the fixing hole 18 provided on the front end of the fixed portion 17, which is folded upwards. As a result, the fixing holes 18 are caulked by the fixing pins 20, so that the spring member 6 is fixed to the frame member 8.

Figure 5:
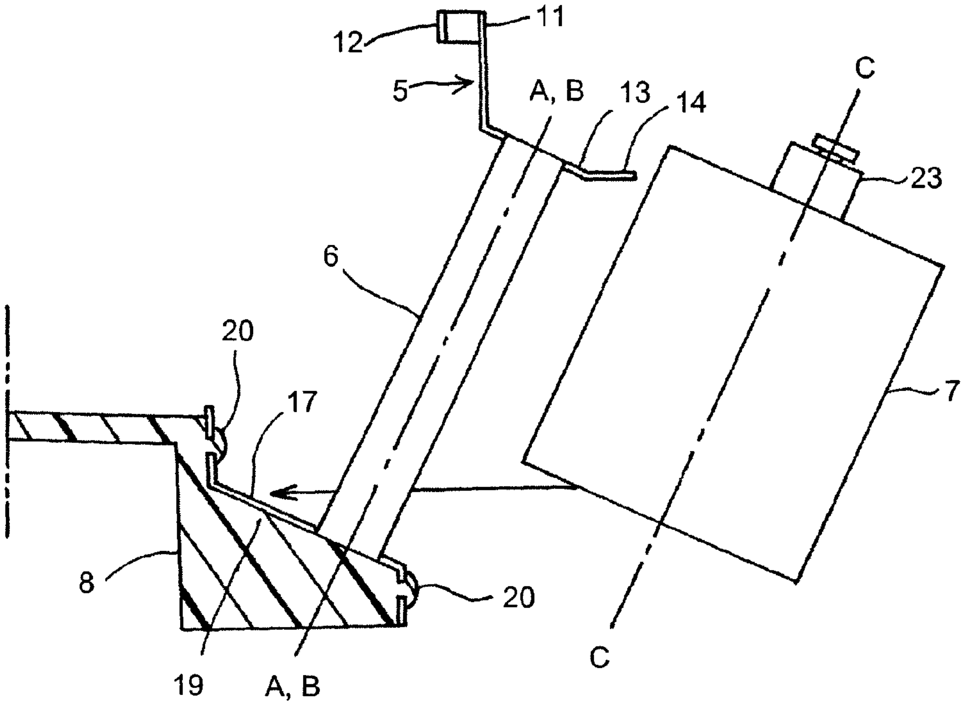
FIG. 5 is a schematic diagram for explaining how a solenoid is attached to the spring member fixed on a frame member.
Figure 7:
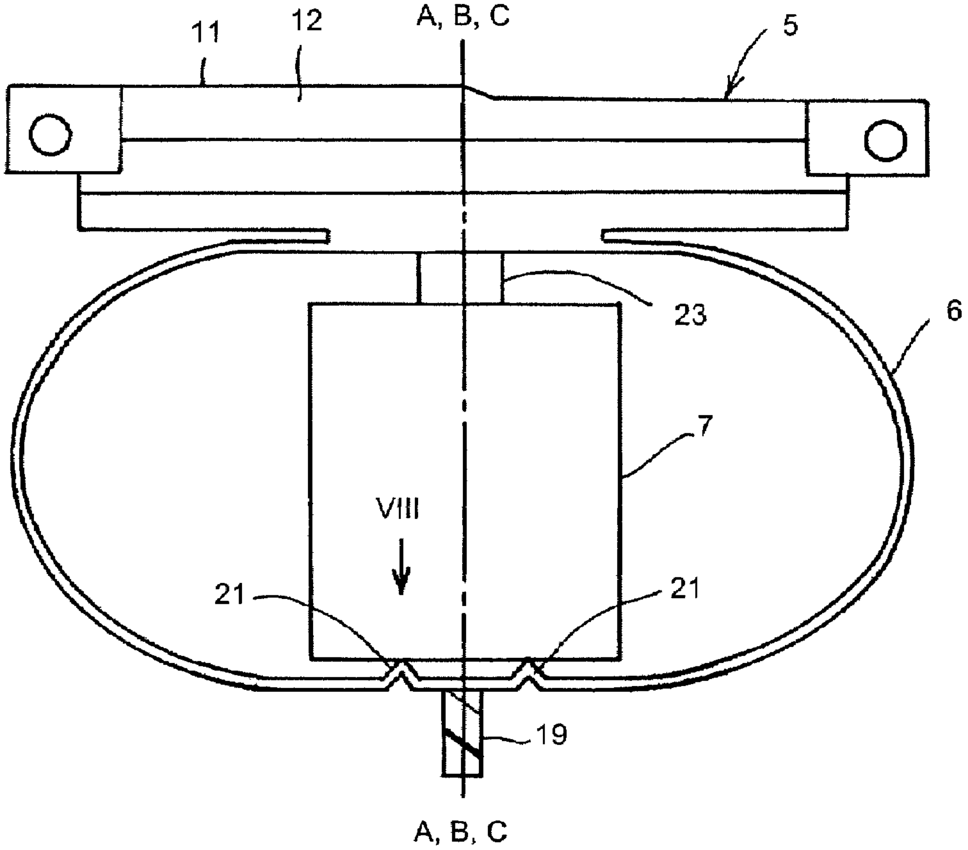
FIG. 7 is a schematic diagram of the solenoid contained in a space of the dome-shaped spring member.

When the spring member 6 integrated with the shade 5 is fixed to the frame member 8, a direction A-A in which a spring force of the spring member 6 acts is perpendicular (or substantially perpendicular) to a tilt direction of the tilted locking rib 19. The direction A-A is, as shown in FIGS. 3, 5, and 7, identical (or substantially identical) to a direction B-B in which a position of the shade 5 is switched between the obliquely upward and backward position (the low-beam position) and the obliquely downward and forward position (the high-beam position). Incidentally, the fixing pins 20 are provided in a different direction from the direction A-A.

Figure 8:
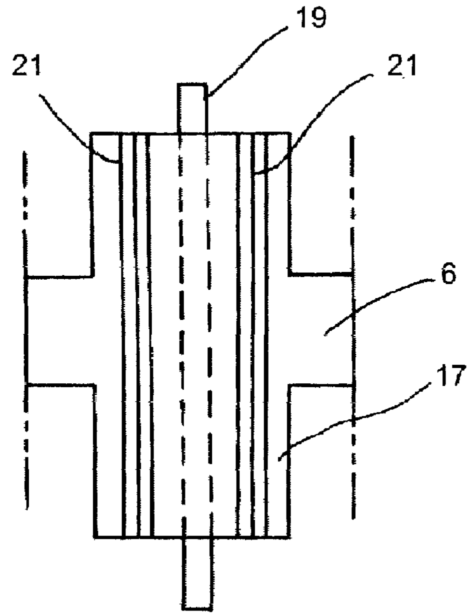
FIG. 8 is a schematic diagram of the spring member and the frame member.
Figure 9:
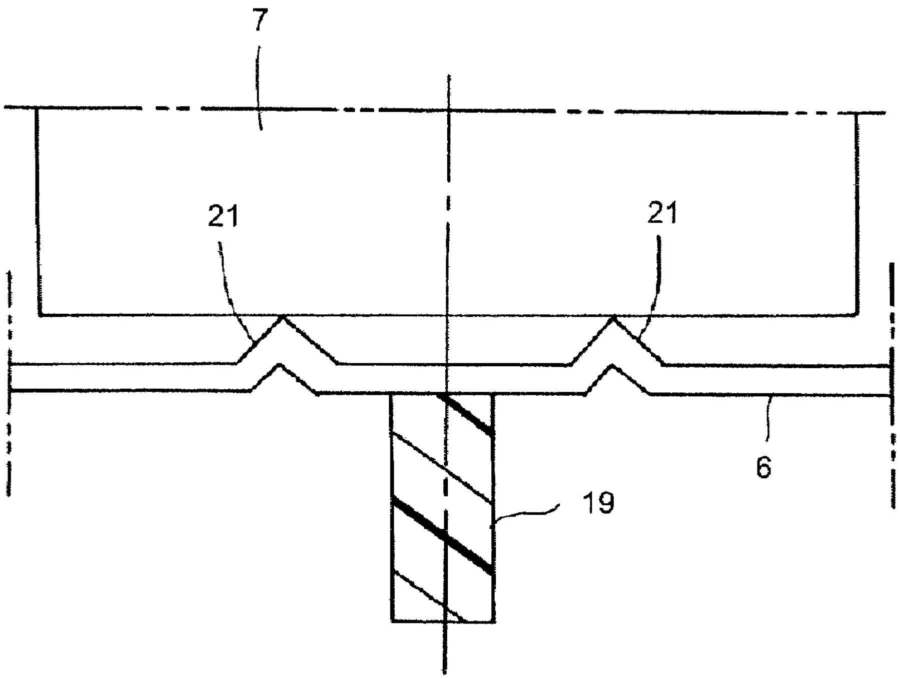
FIG. 9 is a schematic diagram for explaining an example of convex portions that are provided on the spring member.
Figure 10:
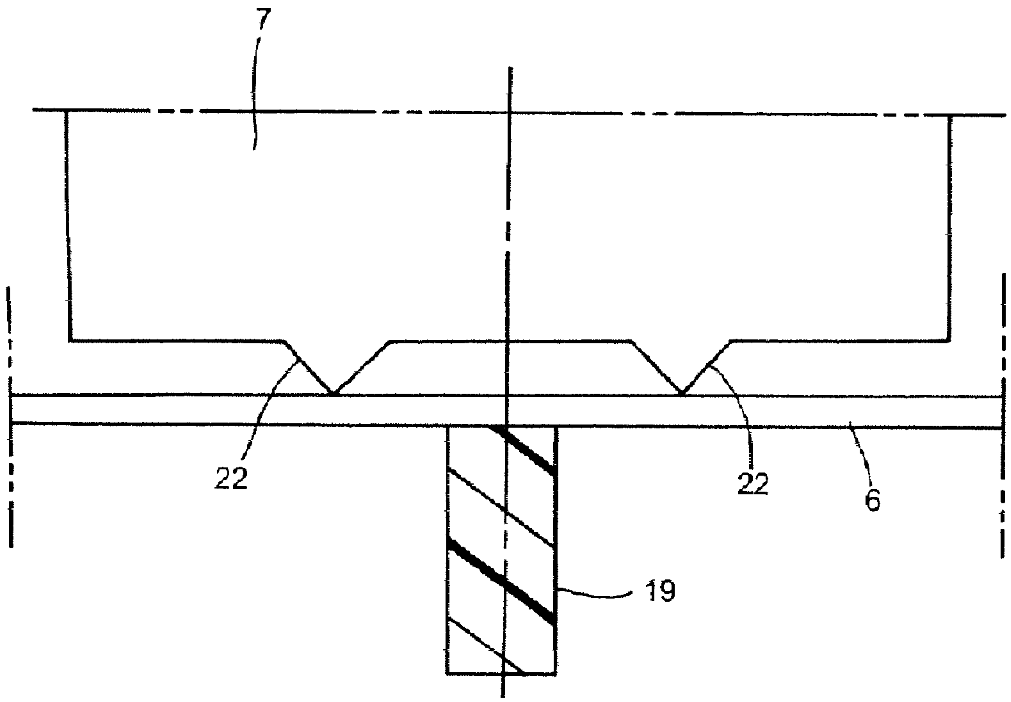
FIG. 10 is a schematic diagram for explaining another example of the convex portions that are provided on the solenoid.

The solenoid 7 is, as shown in FIGS. 5 to 7, contained in a space of the dome-shaped spring member 6 in a direction in which the fixing pins 20 are provided, and also fixed to the frame member 8 by a fixing unit (not shown). As shown in FIGS. 7 to 9, the fixed portion 17 is sandwiched and fixed between a bottom surface of the solenoid 7 and the tilted locking rib 19. Namely, the spring member 6 is doubly fixed to the frame member 8 by the fixing pins 20 and by being sandwiched between the bottom surface of the solenoid 7 and the tilted locking rib 19. As shown in FIG. 9, two pyramid-shaped convex portions 21 are provided on the fixed portion 17 the spring member 6 in both sides of the tilted locking rib 19 to be parallel (or substantially parallel) to the tilted locking rib 19. Instead of providing the convex portions 21 on the fixed portion 17, two pyramid-shaped convex portions 22 can be provided on the bottom surface of the solenoid 7 as shown in FIG. 10.

A distal end of a retractable rod 23 of the solenoid 7 is inserted into the fixing hole 16, so that the retractable rod 23 is fixed to the fixing portion 13. A direction C-C in which the retractable rod 23 moves forward is, as shown in FIG. 7, identical (or substantially identical) to the direction A-A and the direction B-B. In this case, the direction A-A, the direction B-B, and the direction C-C are tilted at approximately 30 degrees to a vertical axis. In other words, the direction A-A, the direction B-B, and the direction C-C are tilted at approximately 60 degrees to the optical axis Z-Z, i.e., a horizontal axis. The solenoid 7 is arranged obliquely downward and forward from the shade 5 is an opposite side of the light source 2 as shown in FIGS. 1 and 2.

Stoppers 24 are provided on the frame member 8. As shown in FIG. 3, when the solenoid 7 is not driven, the convex stopper portions 15 elastically contact the stoppers 24 so that the shade 5 located in the low-beam position is controlled to move in a horizontal direction D and a vertical direction E, which are different directions from the direction B-B (i.e., in an oblique direction from obliquely downward and forward to obliquely upward and backward).

When the light source 2 lights up, the light L1 is emitted from the light-emitting portion of the light source 2. The light L1 is reflected to the sides of the shade 5 and the projector lens 4 by the reflecting surface 10 of the reflector 3. At this time when the solenoid 7 is not driven, i.e., the solenoid 7 does not conduct any electricity, by the action of the spring force of the spring member 6, the retractable rod 23 moves forward, and the shade 5 is biased in a direction of an arrow F shown in FIGS. 1 and 3, and also the two convex stopper portions 15 of the shade 5 elastically contact the two stoppers 24 of the frame member 8 respectively. As a result, the shade 5 is controlled to move in the horizontal direction D and the vertical direction E, and thus the shade 5 is located in the low-beam position as shown in FIG. 1.

When the shade 5 is located in the low-beam position, the reflected light L3 that is mainly reflected from a lower side of the reflecting surface 10 of the reflector 3 (that forms the high-beam light distribution pattern HP shown in FIG. 12) is blocked by the first and second shade portions 11 and 12. On the other hand, the reflected light L2 is reflected to the side of the projector lens 4, and projected ahead of the vehicle in the low-beam light distribution pattern LP shown in FIG. 11 via the projector lens 4.

Figure 2:
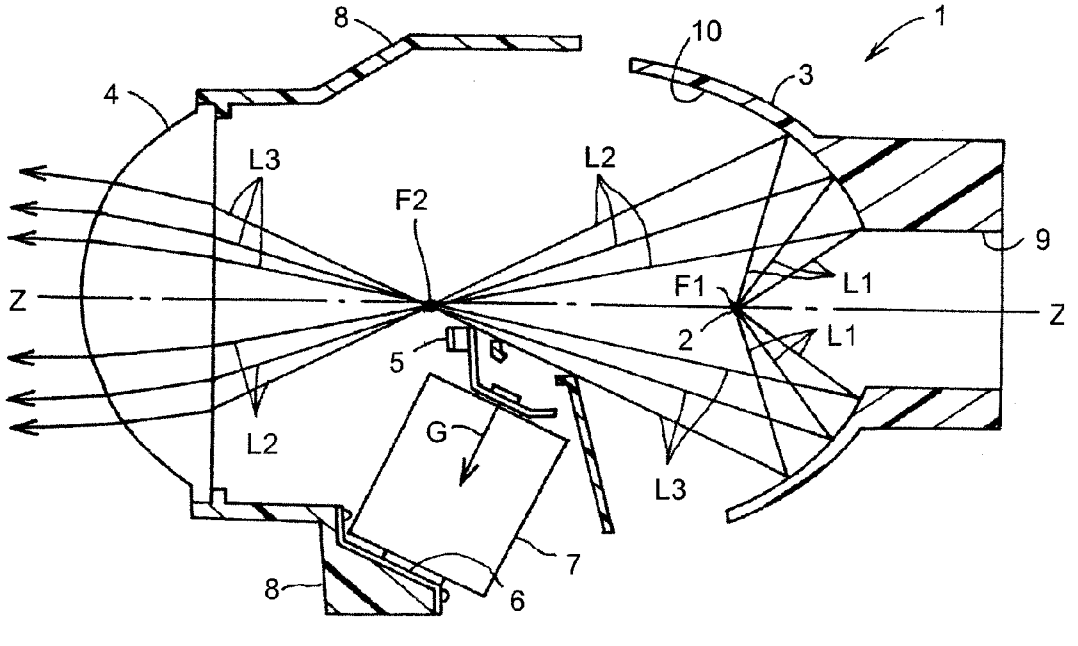
FIG. 2 is a longitudinal cross-sectional view (a vertical cross-sectional view) of the lamp unit when the shade is in a high-beam position.

When the solenoid 7 conducts electricity, i.e., the solenoid 7 is driven, the retractable rod 23 moves backward against the spring force of the spring member 6, so that the shade 5 moves in a direction of an arrow G shown in FIG. 2, i.e., in an opposite direction from the direction of the arrow F shown in FIG. 3. Therefore, the position of the shade 5 is switched from the obliquely upward and backward position, i.e., the low-beam position as shown in FIG. 1 to the obliquely downward and forward position, i.e., the high-beam position as shown in FIG. 2.

As a result, the reflected light L3 that is blocked by the first and second shade portions 11 and 12 is reflected to the side of the projector lens 4 together with the reflected light L2, and projected ahead of the vehicle in the high-beam light distribution pattern HP shown in FIG. 12 via the projector lens 4.

When the solenoid 7 is shielded from the electricity, i.e., the solenoid 7 is not driven, the elastically-deformed spring member 6 is released from the elastic deformation by the spring force of the spring member 6. As a result, the position of the shade 5 is switched from the high-beam position as shown in FIG. 2 to the low-beam position as shown in FIG. 1, and thus the light distribution pattern is also switched from the high-beam light distribution pattern HP shown in FIG. 12 to the low-beam light distribution pattern LP shown in FIG. 11.

Figure 4:
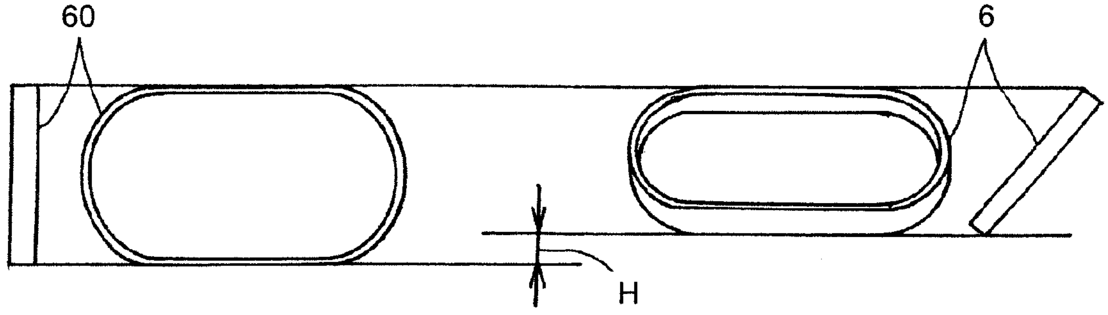
FIG. 4 is a schematic diagram for explaining a height of a spring member of the vehicle headlamp when viewed from the front and lateral sides.

As described above, the vehicle headlamp 1 according the embodiment switches a position of the shade 5 between the low-beam position, i.e., the obliquely upward and backward position as indicated by the solid line in FIGS. 1 and 3 and the high-beam position, i.e., the obliquely downward and forward position as indicated by the solid line in FIG. 2 and the dashed-two dotted line in FIG. 3. Therefore, as shown in FIG. 4, when the vehicle headlamp 1 is viewed from the front and lateral sides, a height of the spring member 6 can be lowered at a height difference H as compared with that of the spring member 60 of a conventional vehicle headlamp. Consequently, a height of the vehicle headlamp 1 can be lowered as compared with that of the conventional vehicle headlamp. Moreover, it is possible to secure a perimeter of the dome portion of the spring member 6 identical (or substantially identical) to that of the spring member 60. Consequently, it is possible to lower the height of the vehicle headlamp 1 without increasing a constant of spring unnecessarily. Furthermore, the height of the spring member 6 viewed from the front and lateral sides can be reduced, so that the entire vehicle headlamp 1 can be miniaturized by arranging the optical-axis adjusting mechanism of the lamp unit along the dome portion of the spring member 6. Furthermore, the height of the spring member 6 viewed from the front and lateral sides can be reduced, so that a height of the lamp unit can be also reduced. As a result, a swivel unit capable of swiveling the lamp unit can be provided in the almost center of a bottom portion of the lamp unit, and thus it is possible to reduce restraints in a layout of the vehicle headlamp 1.

Furthermore, the vehicle headlamp 1 switches a position of the shade 5 between the low-beam position and the high-beam position in a direction perpendicular (or substantially perpendicular) to the reflected light L3 that is mainly reflected from the lower side of the reflecting surface 10 of the reflector 3 (that forms the high-beam light distribution pattern HP shown in FIG. 12). Therefore, although a stroke for switching the position of the shade 5 is relatively short as compared with that is in the conventional vehicle headlamp in which a position of the shade is switched in an upward direction or a downward direction, the reflected light L3 can be shed sufficiently.

Namely, the vehicle headlamp 1 according the embodiment can shorten the stroke for switching the position of the shade 5. Consequently, it is possible to lower the spring force of the spring member 6 and the driving force of the solenoid 7, and therefore it is possible to use the spring member 6 and the solenoid 7 that are relatively compact and inexpensive. Thus, it is possible to achieve not only the reduction in size and weight of the entire vehicle headlamp 1 but also the reduction in cost of producing the vehicle headlamp 1.

Figure 13:
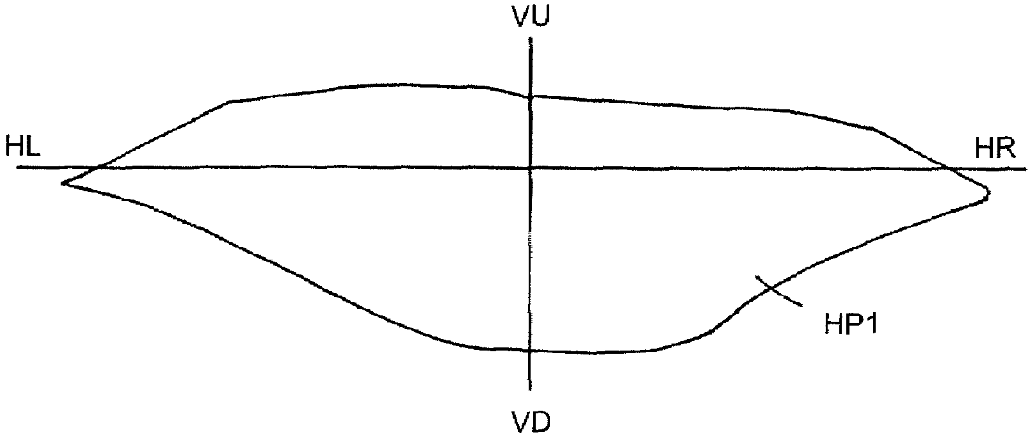
FIG. 13 is a schematic diagram for explaining a conventional high-beam light distribution pattern to be obtained in a conventional vehicle headlamp.

Furthermore, in the vehicle headlamp 1 according to the embodiment, the reflected light L3 that is mainly reflected from the lower side of the reflecting surface 10 of the reflector 3 can be shed sufficiently, so that it is possible to sharpen a difference between the low-beam light distribution pattern LP shown in FIG. 11 and the high-beam light distribution pattern HP shown in FIG. 12 (a switching effect). Specifically, in the high-beam light distribution pattern HP obtained by the vehicle headlamp 1, a relatively strong light (a large amount of light) is not emitted to the front upper side, as compared with a high-beam light distribution pattern HP1 obtained by the conventional vehicle headlamp as shown in FIG. 13. This is because most of objects located in the front upper side, such as a signboard, are visible even in a relatively weak light (a small amount of light), so that it is not necessary to project the relatively strong light to the front upper side. If the relatively strong light is projected to the front upper side, a driver may feel annoyed with the relatively strong light. Then, most of objects located in both the upper right side and the upper left side, such as roadside trees, are tall, so that the driver does not feel annoyed even when the relatively strong light is projected to the upper right side and the upper left side. On the contrary, when the relatively strong light is projected to the upper right side and the upper left side, it is possible to sharpen the difference between the low-beam light distribution pattern LP and the high-beam light distribution pattern HP.

Furthermore, the vehicle headlamp 1 according to the embodiment switches a position of the shade 5 between the low-beam position and the high-beam position. In other words, when the shade 5 is switched between the low-beam position and the high-beam position, the shade 5 moves along the meridional image surface of the projector lens 4, and therefore a gap between an orbit of the shade 5 and the meridional image surface can be minimized. Thus, it is possible to obtain the preferred light distribution patterns LP and HP.

Furthermore, in the vehicle headlamp 1 according to the embodiment, when the solenoid 7 is not driven, the shade 5 is controlled to move in the horizontal direction D and the vertical direction E, which are different directions from the direction B-B in which the position of the shade 5 is switched, by the stoppers 24. Therefore, it is possible to improve a positioning accuracy of the shade 5, and also to obtain the accurate light distribution patterns LP and HP. Specifically, the shade 5 located in the low-beam position is controlled to move in the directions D and E, which are different from the direction B-B, by the stoppers 24. Therefore, when the shade 5 is switched between the low-beam position and the high-beam position, the shade 5 and the stoppers 24 do not contact each other, and therefore the shade 5 and the stoppers 24 have no sliding resistance. Thus, it is possible to improve a switching accuracy and a switching reliability of the shade 5.

Furthermore, in the vehicle headlamp 1 according to the embodiment, the solenoid 7 is located away from the light source 2, so that the solenoid 7 can be protected from heat of the light source 2. Therefore, it is possible to maintain a performance of the solenoid 7, and also to switch a position of the shade 5 between the low-beam position and the high-beam position smoothly and accurately.

Furthermore, in the vehicle headlamp 1 according to the embodiment, the spring member 6 is fixed by the existing parts such as the frame member 8 and the solenoid 7. Therefore, it is possible to reduce the number of parts, and thereby reducing the production cost. Moreover, the spring member 6 is sandwiched and held between the frame member 8 and the solenoid 7, and also fixed by the spring force of the spring member 6. Therefore, the spring member 6 can be fixed tight due to the spring force of the spring member 6.

Furthermore, in the vehicle headlamp 1 according to the embodiment, as shown in FIG. 8, the tilted locking rib 19 of the frame member 8 contacts the fixed portion 17 of the spring member 6 in a line contact, so that the spring member 6 can be fixed tighter as compared with that is in a plane contact. Moreover, the convex portions 21 of the spring member 6 elastically contact the bottom surface of the solenoid 7 as shown in FIGS. 7 and 9, or the convex portions 22 of the solenoid 7 contact the spring member 6 as shown in FIG. 10. Therefore, it is possible to prevent a slight displacement of the fixed spring member 6 because of the spring force of the spring member 6 due to a reaction force of the spring member 6.

Furthermore, in the vehicle headlamp 1 according to the embodiment, as shown in FIGS. 5 and 6, a direction in which the fixing pins 20 of the frame member 8 are fitted in the fixing holes 18 of the spring member 6 is identical (or substantially identical) to a direction in which the solenoid 7 is contained in the spring member 6. Therefore, a direction in which the spring member 6 is fixed to the frame member 8 can be identical to a direction in which the solenoid 7 is fixed to the frame member 8. Thus, it is possible to consolidate the directions in which the parts are fixed, and thereby reducing the production cost.

Furthermore, in the vehicle headlamp 1 according to the embodiment, as shown in FIGS. 5 and 6, the fixing pins 20 of the frame member 8 and the fixing holes 18 of the spring member 6 can be used not only as a fixing unit but also as a positioning unit.

A variation of the present invention is explained below. The low-beam light distribution pattern LP shown in FIG. 11 and the high-beam light distribution pattern HP shown in FIG. 12 can be obtained in the vehicle headlamp 1 as described above, but the present invention is not limited to a combination of the above light distribution patterns LP and HP. Alternatively, it is also possible to obtain a combination of the low-beam light distribution pattern LP and a light distribution pattern for an expressway, or a combination of the low-beam light distribution pattern LP, the high-beam light distribution pattern HP, and the light distribution pattern for the expressway.

Furthermore, the solenoid 7 is used as the drive unit in the above embodiment, but the present invention is not limited to the solenoid. Instead of the solenoid, a motor can be used as the drive unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projector-type vehicle headlamp capable of obtaining a plurality of light distribution patterns, comprising:

a light source that emits a light;

a reflector that reflects the light from the light source;

a projector lens that projects a reflected light from the reflector ahead of a vehicle;

a shade that is used to switch the reflected light into a plurality of beams in a plurality of light distribution patterns; and a switching unit that switches a position of the shade between an obliquely upward and backward position and an obliquely downward and forward position to obtain the light distribution patterns, the switching unit including a spring member and a drive unit, wherein the drive unit includes a solenoid with a retractable rod, a direction in which the retractable rod moves is identical to a direction in which the shade is switched between the obliquely upward and backward position and the obliquely downward and forward position, and the solenoid is arranged obliquely downward and forward from the shade in an opposite side of the light source.

2. The vehicle headlamp according to claim 1, further comprising a stopper that limits a movement of the shade in two directions different from a direction in which the shade is switched between the obliquely upward and backward position and the obliquely downward and forward position at a non-driving time of the drive unit.

3. A projector-type vehicle headlamp capable of obtaining a plurality of light distribution patterns, comprising:

a light source that emits a light;

a reflector that reflects the light from the light source;

a projector lens that projects a reflected light from the reflector ahead of a vehicle;

a shade that is used to switch the reflected light into a plurality of beams in a plurality of light distribution patterns; and a switching unit that switches a position of the shade between an obliquely upward and backward position and an obliquely downward and forward position to obtain the light distribution patterns, the switching unit including a spring member and a drive unit, wherein the spring member has a dome shape, the shade is integrated with the spring member, a direction in which a spring force of the spring member acts is identical to a direction in which the shade is switched between the obliquely upward and backward position and the obliquely downward and forward position, and the spring member is sandwiched and fixed between the drive unit and a frame member to which the drive unit is fixed.

4. The vehicle headlamp according to claim 3, wherein a rib is provided on a portion of the frame member where the spring member is sandwiched, and the rib contacts the spring member in a line contact.

5. The vehicle headlamp according to claim 3, wherein a convex portion is provided on a portion of the spring member where the spring member is sandwiched between the drive unit and the frame member, and the convex portion elastically contacts the drive unit.

6. The vehicle headlamp according to claim 3, wherein a convex portion is provided on a portion of the drive unit where the spring member is sandwiched, and the convex portion elastically contacts the spring member.

7. The vehicle headlamp according to claim 3, wherein a fixing pin for fixing the spring member by caulking the spring member is provided on a portion of the frame member where the spring member is fixed, the fixing pin being provided on the portion in a different direction from the direction in which the spring force of the spring member acts and in a direction in which the drive unit is contained in a space of the spring member having the dome shape.

8. The vehicle headlamp according to claim 7, wherein a fixing hole is provided on a portion of the spring member where the spring member is fixed by being caulked by the fixing pin, and the fixing pin is inserted into the fixing hole to position the spring member and the frame member.

* * * * *